United States Patent

Stocchiero

Patent Number: 5,496,660
Date of Patent: Mar. 5, 1996

[54] POLAR ELEMENT FOR STORAGE BATTERIES

[76] Inventor: Olimpio Stocchiero, Via Kennedy 4, 36050 Montorso Vincentino (VI), Italy

[21] Appl. No.: 341,567
[22] PCT Filed: Nov. 16, 1993
[86] PCT No.: PCT/EP93/03215
   § 371 Date: Nov. 22, 1994
   § 102(e) Date: Nov. 22, 1993
[87] PCT Pub. No.: WO94/13023
   PCT Pub. Date: Jun. 9, 1994

[30] Foreign Application Priority Data

Nov. 20, 1992 [IT] Italy .................. VI92U0078

[51] Int. Cl.⁶ .................................... H01M 2/06
[52] U.S. Cl. ............................... 429/183; 429/208
[58] Field of Search ........................... 429/183, 208, 429/159; 252/512

[56] References Cited

U.S. PATENT DOCUMENTS

| | | | |
|---|---|---|---|
| 19,759 | 3/1858 | Doyle | 429/183 |
| 1,982,801 | 12/1934 | Gerking | 429/159 |
| 3,644,149 | 2/1972 | Coffey et al. | 429/183 |
| 4,272,592 | 3/1981 | Miyagawa | 429/161 |
| 4,545,927 | 10/1985 | Railsback | 252/512 |
| 4,816,184 | 3/1989 | Fukuda et al. | 252/512 |
| 5,018,520 | 5/1991 | Hubner et al. | 128/205 |
| 5,034,157 | 7/1991 | Merrell et al. | 252/512 |

Primary Examiner—Stephen Kalafut
Assistant Examiner—Carol Chaney
Attorney, Agent, or Firm—Watson, Cole, Grindle & Watson

[57] ABSTRACT

The invention discloses a polar element (1) for storage batteries comprising a pole (2) made of lead and electrically connected with the internal elements of the battery, an insert (4) lodged in said pole, supporting the connection (7) between the polar elements connected to one another, said polar element being characterized in that said pole (2) is obtained by means of cold-forming casting process and in that the insert (4) is connected to said pole through connecting means such that it becomes removable.

7 Claims, 2 Drawing Sheets

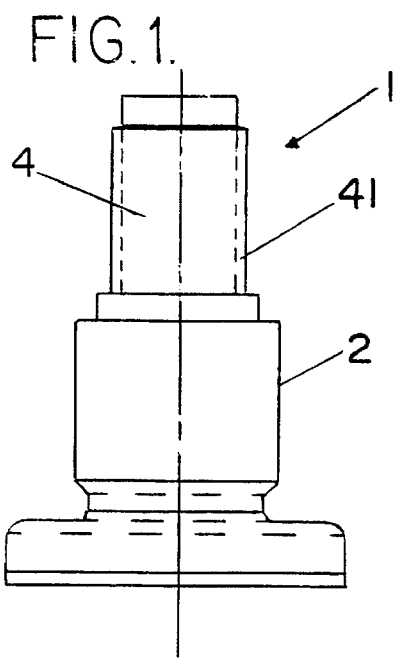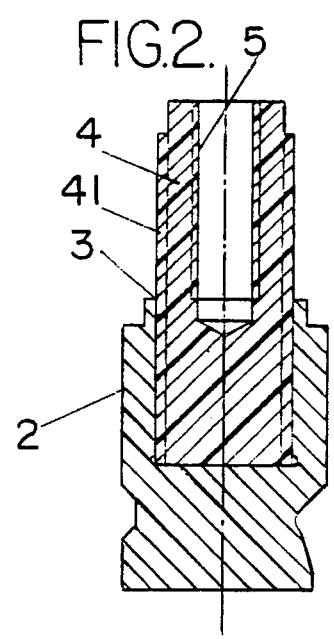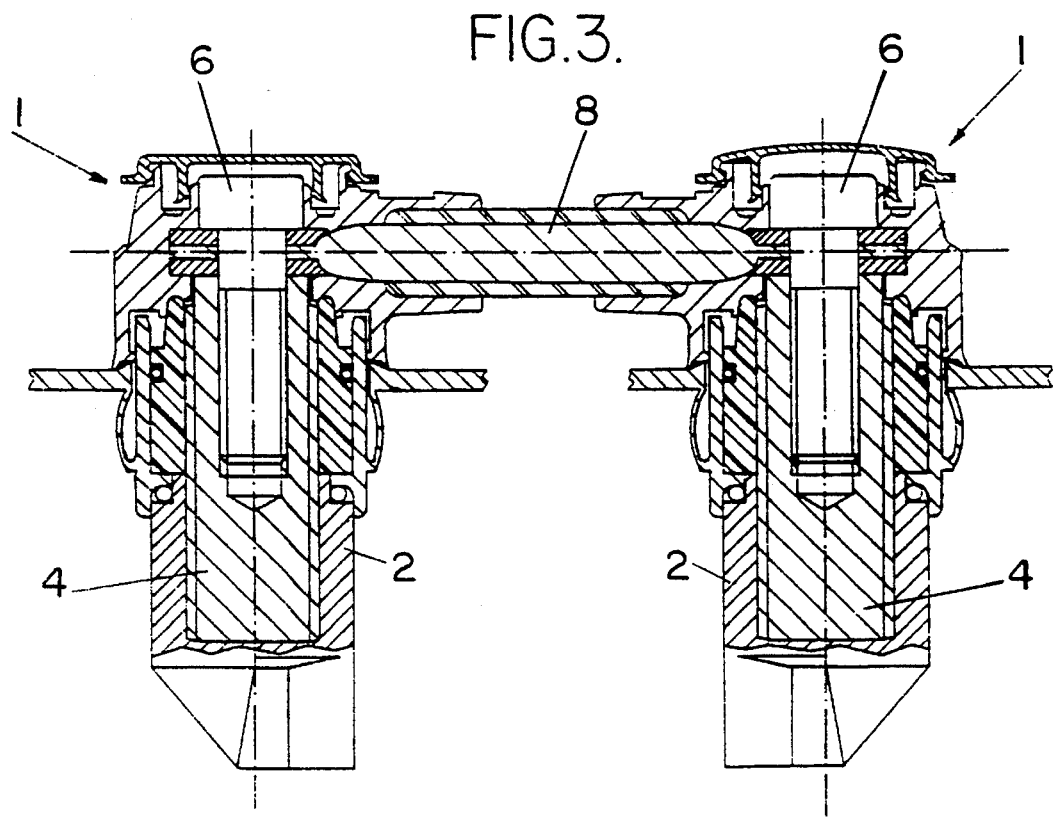

POLAR ELEMENT FOR STORAGE BATTERIES

BACKGROUND OF THE INVENTION

1. Field of the Invention

The present invention concerns a polar element for lead-acid storage batteries presenting an insert supporting the connections between polar elements, said insert being apt to be inserted or removed in relation to the pole.

2. General State of the Art

The polar elements belonging to the known technique, with reference to the traction batteries and to the stationary batteries in particular, present a pole made of lead which is obtained by means of a casting process and is electrically connected with the internal elements of the battery. An insert, usually made of copper or brass, is buried into the pole during the casting process itself. It is a known fact that the copper insert overhangs the actual lead pole and said insert forms the supporting and resting base of the connections which connect several polar elements with one another.

During the life of the battery it has been noticed that the polar elements, the lead poles of which are obtained by means of a casting process, present considerable porosity which allow the electrolyte to filter through the casting until it reaches the copper insert.

When the copper insert comes into contact with the electrolyte, there is a high oxidation of the copper itself thus considerably reducing the electrical conductivity of the copper until the electrical efficiency of the battery becomes irreparably impaired.

In this case it is necessary to proceed to the replacement of the poles, so as to eliminate the cause of the poor performance of the battery, due to the loss of conductivity of the copper inserts. It is easy to understand what inconvenience and what cost such operation involves, so that often it is more convenient to replace the battery.

The purpose of the present invention is to obviate the inconveniences now mentioned.

SUMMARY OF THE INVENTION

It is, therefore, the intention of the invention to realize a polar element in which the conductor insert, linked to the connections of the battery elements, does not suffer because of the previously mentioned aging process and in case of failure it may be removed and replaced very quickly and at a low cost.

It is also the intention to reduce drastically, if not entirely to eliminate, the phenomenon causing the insert to deteriorate and that is to eliminate the damages of the porosity of the material made of lead which forms the base of the pole.

All the purposes previously mentioned and others which will be better explained hereinafter, are reached thanks to the construction of a polar element for lead-acid storage batteries, realized according to the invention, wherein the polar element comprises:

a pole made of lead and electrically connected with the internal elements of the battery;

an insert made of conducting material, lodged in said pole and supporting the connection between polar elements connected to one another, wherein said insert is characterized in that it is connected with the pole, so that it can be removed therefrom, through connecting means interacting between the pole and the insert, said insert being removable in relation to the pole.

According to one particular embodiment of the invention, the pole is obtained by means of a cold forging process and has its hole threaded through roll forming, so that the insert can be screwed into it.

According to another embodiment, not represented in the drawings, the pole and the insert are connected to one another through a bayonet coupling.

Moreover, the pole according to the invention can be obtained through the known casting method.

BRIEF DESCRIPTION OF THE DRAWINGS

Further scope of applicability of the present invention will become apparent from the detailed description given hereinafter. With reference to the drawings wherein:

FIG. 1 represents a view of the polar element according to the invention;

FIG. 2 is a cross-section of the polar element;

FIG. 3 shows two polar elements according to the invention connected to one another within a battery.

DESCRIPTION OF THE PREFERRED EMBODIMENT

Figure 4A:
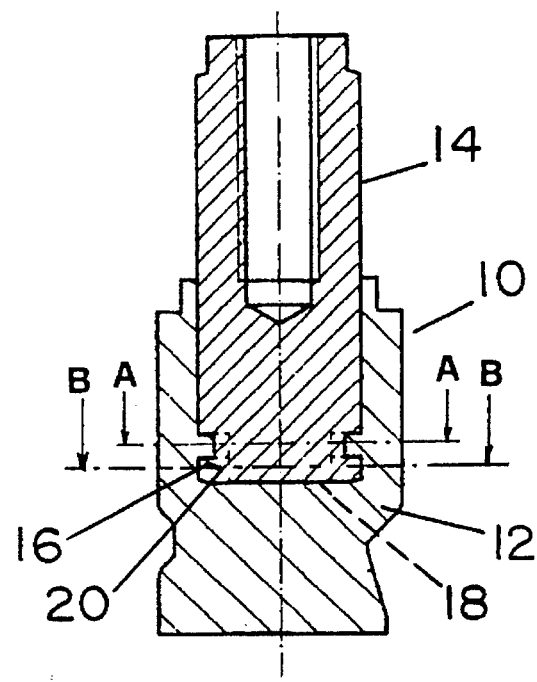
FIGS. 4A–4C respectively show a side sectional view of a bayonet coupling and sectional views along lines A—A and B—B of FIG. 4A.

With reference to the mentioned FIGS., the polar element is indicated as a whole with 1 and presents a pole 2 which is electrically connected with the battery internal elements at the base. Said pole is made of lead and is formed by means of cold forging, or by casting process.

Thus the external forming of the pole and also the central hole 3 of the pole 2 are obtained. Subsequently the central hole 3 of the pole 2 is roll-formed, so as to obtain a thread suited to match the brass insert 4 which presents a thread 41, as can be observed in the FIGS. 2 and 3.

The insert 4 is also provided with an internal hole 5 being threaded, too, which, as can be observed in FIG. 3, matches the screw 6 fixing the ring 7 belonging to the connecting element 8 which connects two poles 1 belonging to elements of storage batteries.

If the pole 2 is obtained by means of cold forging it does not present any characteristics of porosity and suction, because of the capillarity of the electrolyte in which it is immersed and, therefore, the electrolyte is generally prevented from reaching the insert 4, which it would damage if it did.

Should it happen, however, that because of some capillarity the electrolyte on the pole does reach the insert, said insert can be quickly unscrewed and replaced with a new unoxidized insert, because of the presence in the insert 4 of the thread 41, thus obtaining the advantage proposed by the present invention, that is to quickly replace possible inserts belonging to the poles which may have been oxidized by the electrolyte.

Figure 4B:
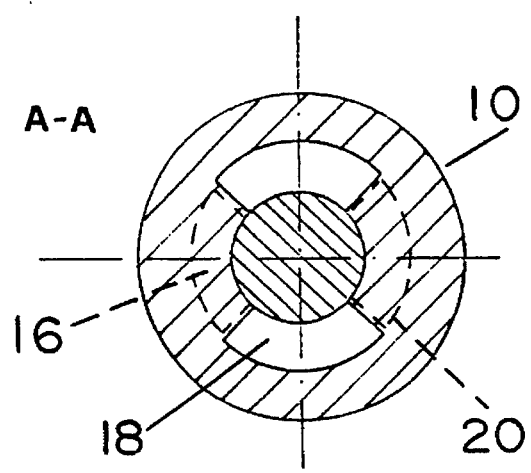
Figure 4C:
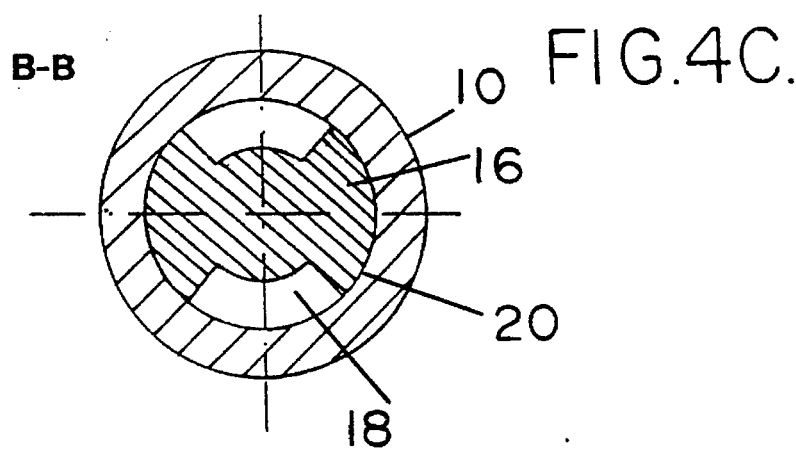

The same advantage of quickly replacing and disassembling it can be obtained if the thread 41 of the insert 4 is replaced with a bayonet joint inserted in a corresponding hollow obtained in the hole 3 of the pole 2, said insert being realized according to the known technique. For example, FIG. 4A illustrates such a bayonet coupling 10 between pole 12 and insert 14. FIGS. 4B and 4C respectively illustrate sectional views of the bayonet coupling 10 taken along lines A—A and B—B of FIG. 4A. In FIGS. 4B and 4C, insert 14 has ears 16 which are axially slidable in axial recesses 18 and circumferentially slidable in annular recesses 20.

It will be pointed out that the insert of the polar element, which is usually made of brass, can also be made of plastic material charged with dispersions made of metal, or aluminum or other materials which can however insure the electrical conduction between the polar base 2 and the connection 7.

What is claimed is:

1. A polar element for connecting internal elements of a lead acid storage battery with an external terminal, comprising:

a pole securable to the battery for connection with the internal elements thereof, said pole having an external opening therein;

a removable insert formed of a conductive material locatable in the opening of the pole and including means for coupling the insert to the external terminal; and connecting means including mating portions of the pole and the insert for allowing said insert to be removable with respect to the pole.

2. The polar element according to claim 1 wherein the pole is formed by at least one of cold forging and casting.

3. The polar element according to claim 1 wherein the connecting means between the pole and the insert comprises a threaded wall portion of the external opening and a mating threaded portion of the insert for engaging the threaded wall portion of said external opening.

4. The polar element according to claim 1 wherein the connecting means comprises a bayonet coupling between the pole and the insert.

5. The polar element according to claim 1 wherein said insert is formed of a plastic material rendered conductive by loading with a dispersion of electrically conductive metallic material.

6. The polar element according to claim 1 wherein the external opening is centrally located in the pole.

7. The polar element according to claim 1 wherein the insert has a threaded hole formed therein in the means for connecting the external terminal to the insert comprises a threaded bolt for engaging the hole.

\* \* \* \* \*